United States Patent
McCraw

(10) Patent No.: US 7,356,859 B2
(45) Date of Patent: *Apr. 15, 2008

(54) BEDDING FOUNDATION SUPPORT MODULE

(75) Inventor: Kevin N. McCraw, Burnsville, NC (US)

(73) Assignee: Hickory Springs Manufacturing Company, Hickory, NC (US)

( * ) Notice: Subject to any disclaimer, the term of this patent is extended or adjusted under 35 U.S.C. 154(b) by 128 days.

This patent is subject to a terminal disclaimer.

(21) Appl. No.: 11/345,117

(22) Filed: Feb. 1, 2006

(65) Prior Publication Data

US 2007/0180614 A1     Aug. 9, 2007

(51) Int. Cl.
*A47C 23/04*     (2006.01)
*F16F 3/00*     (2006.01)

(52) U.S. Cl. .................... 5/247; 5/255; 5/719; 267/103

(58) Field of Classification Search .............. 5/247, 5/255, 260, 264.1, 265–267, 719, 716; 267/103–107, 267/95, 144, 165
See application file for complete search history.

(56) References Cited

U.S. PATENT DOCUMENTS

| | | |
|---|---|---|
| 1,528,125 A | 3/1925 | Morse |
| 2,201,997 A | 5/1940 | Freund |
| 2,415,765 A | 2/1947 | Schmidt |
| 2,560,842 A | 7/1951 | Blumensaadt et al. |
| 2,859,802 A | 11/1958 | Asaro |
| 3,080,579 A | 3/1963 | Gordon |
| 3,083,001 A | 3/1963 | Makowski et al. |
| 3,286,281 A | 11/1966 | Sominski |
| 3,288,458 A | 11/1966 | Gutzman |
| 3,391,412 A | 7/1968 | Bronstein, Jr. et al. |
| 3,546,723 A | 12/1970 | Ciampa et al. |
| 3,660,854 A | 5/1972 | Garceau |
| 3,662,411 A | 5/1972 | Garceau |
| 3,725,965 A | 4/1973 | Smith et al. |
| 3,766,578 A | 10/1973 | Toupal |
| 3,777,322 A | 12/1973 | Larkin |
| 3,803,689 A | 4/1974 | Baginski |
| 3,825,960 A | 7/1974 | Inman et al. |
| 3,907,266 A | 9/1975 | Sano et al. |
| 3,916,463 A | 11/1975 | Higgins |
| 4,000,531 A | 1/1977 | Inman |
| 4,068,329 A | 1/1978 | Gross et al. |
| 4,069,525 A | 1/1978 | Valoff |
| 4,101,993 A | 7/1978 | Yates et al. |
| 4,251,892 A | 2/1981 | Hancock |
| 4,339,834 A | 7/1982 | Mizelle |
| 4,377,279 A | 3/1983 | Schulz, Jr. et al. |
| 4,398,705 A | 8/1983 | Mizelle |
| 4,452,438 A | 6/1984 | Hancock et al. |

(Continued)

*Primary Examiner*—Robert G. Santos
(74) *Attorney, Agent, or Firm*—Marshall, Gerstein & Borun LLP

(57) ABSTRACT

A support module for use in a bedding foundation to support a support surface above a bedding foundation base, the support module being of an independent wire form configured to define a top portion, a bottom portion, and four predominantly straight support legs, wherein the support legs are skewed with respect to each other, such that each respective support leg is not parallel to any of the other support legs. The top of each support leg is bent to be oriented into a common first plane to form the top portion, which may be connected to a wire grid assembly to form a nestable bedding foundation.

20 Claims, 4 Drawing Sheets

U.S. PATENT DOCUMENTS

| | | |
|---|---|---|
| 4,470,584 A | 9/1984 | Mizelle |
| 4,489,450 A | 12/1984 | Miller |
| 4,559,654 A | 12/1985 | Mizelle |
| 4,577,841 A | 3/1986 | Hagemeister |
| 4,595,180 A | 6/1986 | Hagemeister |
| 4,595,181 A | 6/1986 | Hagemeister |
| 4,620,336 A | 11/1986 | Miller |
| 4,654,905 A | 4/1987 | Miller |
| 4,666,136 A | 5/1987 | Hagemeister |
| 4,675,927 A | 6/1987 | Mizelle |
| 4,684,111 A | 8/1987 | Hagemesiter |
| 4,685,162 A | 8/1987 | Higgins et al. |
| 4,685,659 A | 8/1987 | Hagemeister |
| 4,703,527 A | 11/1987 | Mizelle |
| 4,704,752 A | 11/1987 | Yates et al. |
| 4,721,290 A | 1/1988 | Hagemeister |
| 4,729,550 A | 3/1988 | Hagemeister |
| 4,730,357 A | 3/1988 | Wells |
| 4,730,358 A | 3/1988 | Zapletal |
| 4,736,933 A | 4/1988 | Hagemeister |
| 4,739,977 A | 4/1988 | Dabney |
| 4,760,616 A | 8/1988 | Hiatt et al. |
| 4,766,625 A | 8/1988 | Yates et al. |
| 4,770,397 A | 9/1988 | Schulz, Jr. |
| 4,771,995 A | 9/1988 | Wells et al. |
| 4,776,572 A | 10/1988 | Surletta et al. |
| 4,778,157 A | 10/1988 | Thomas |
| 4,779,293 A | 10/1988 | Dabney et al. |
| 4,805,883 A | 2/1989 | Kitchen |
| 4,838,528 A | 6/1989 | Hagemeister |
| 4,862,531 A | 9/1989 | Wells |
| 4,862,532 A | 9/1989 | Wells et al. |
| 4,867,424 A | 9/1989 | Dabney |
| 4,891,853 A | 1/1990 | Dabney |
| 4,896,386 A | 1/1990 | Ogle et al. |
| 4,903,949 A | 2/1990 | Schulz, Jr. |
| 4,921,228 A | 5/1990 | Lowe |
| 4,932,535 A | 6/1990 | Dabney |
| 4,995,125 A | 2/1991 | Dennison |
| 5,005,809 A | 4/1991 | Harmon |
| 5,052,064 A | 10/1991 | Hagemeister et al. |
| 5,054,751 A | 10/1991 | Brown |
| 5,142,716 A | 9/1992 | Ogle et al. |
| 5,152,509 A | 10/1992 | Wells et al. |
| 5,165,667 A | 11/1992 | Dabney |
| 5,176,367 A | 1/1993 | Rodgers et al. |
| 5,178,372 A | 1/1993 | Rodgers et al. |
| 5,188,344 A | 2/1993 | Dabney |
| 5,197,155 A | 3/1993 | Ogle et al. |
| 5,231,712 A | 8/1993 | Edwards et al. |
| 5,246,210 A | 9/1993 | Dabney et al. |
| 5,346,188 A | 9/1994 | Rodgers et al. |
| 5,346,190 A | 9/1994 | Dabney |
| 5,361,434 A | 11/1994 | Hagemeister et al. |
| 5,369,822 A | 12/1994 | Dennison |
| 5,370,374 A | 12/1994 | Rodgers et al. |
| 5,395,097 A | 3/1995 | Dabney et al. |
| 5,401,007 A | 3/1995 | Dabney et al. |
| 5,438,716 A | 8/1995 | Dabney |
| 5,497,979 A | 3/1996 | Schulz, Jr. et al. |
| 5,551,104 A | 9/1996 | Hartline |
| 5,558,315 A | 9/1996 | Constantinescu et al. |
| 5,562,274 A | 10/1996 | Kitchen et al. |
| 5,622,357 A | 4/1997 | Schulz, Jr. et al. |
| 5,704,595 A | 1/1998 | Kitchen et al. |
| 5,720,471 A | 2/1998 | Constantinescu et al. |
| 5,778,466 A | 7/1998 | Price |
| 5,964,453 A * | 10/1999 | McCraw ..................... 267/103 |
| 5,967,499 A | 10/1999 | McCraw et al. |
| 6,134,729 A | 10/2000 | Quintile et al. |
| 6,192,538 B1 | 2/2001 | Fogel |
| 6,272,700 B1 | 8/2001 | Wickstrom |
| 6,406,009 B1 | 6/2002 | Constantinescu et al. |
| 6,419,212 B1 | 7/2002 | Arnold et al. |
| 6,481,033 B2 | 11/2002 | Fogel |
| 6,484,339 B2 | 11/2002 | Mossbeck et al. |
| 6,578,213 B2 * | 6/2003 | Dabney ......................... 5/247 |
| 6,601,249 B2 | 8/2003 | Arnold et al. |
| 6,651,276 B2 * | 11/2003 | McCraw et al. ............... 5/246 |
| 7,237,282 B2 * | 7/2007 | Beck et al. ..................... 5/247 |
| 2003/0028963 A1 * | 2/2003 | McCraw et al. ............... 5/246 |
| 2007/0174961 A1 * | 8/2007 | McCraw ......................... 5/247 |
| 2007/0180614 A1 * | 8/2007 | McCraw ......................... 5/247 |

* cited by examiner

BEDDING FOUNDATION SUPPORT MODULE

BACKGROUND OF THE INVENTION

1. Field of the Invention

The present invention generally relates to bedding foundations, and more particularly to support modules for use in nestably stackable wire bedding foundations.

2. Discussion of the Prior Art

It has become more common for mattress sets to include an upper spring mattress and a lower semi-rigid bedding foundation, instead of a lower box spring mattress. The completed semi-rigid bedding foundation is typically manufactured in stages, by two or more different manufacturers. The first manufacturer makes a wire bedding foundation assembly having a plurality of support modules or other support structures connected to a wire grid assembly that represents a support surface. The second manufacturer makes a wooden slatted base to which the wire assembly is mounted. The second manufacturer or a third manufacturer then finishes the process of making the completed bedding foundation by attaching the wire assembly to a wooden slatted base, and then typically adding padding and a fabric cover.

To date, there are numerous versions of such semi-rigid bedding foundations, and it has been found to be particularly efficient for warehousing and shipping purposes if the wire assemblies are made to be nestably stackable. That is to say that when one wire bedding foundation assembly is stacked atop another like wire assembly, portions of the upper wire assembly fit at least partially within the lower wire assembly, such that the height of the two wire assemblies when stacked is less than the total of the individual heights of the two wire assemblies added together.

The bedding industry has developed various nestably stackable configurations, which either utilize individual support modules connected to an upper wire grid, such as is disclosed in U.S. Pat. No. 5,967,499, or use some form of elongated bent wires that run the length of a bedding foundation to create a nestably stackable foundation, such as disclosed in U.S. Pat. No. 5,052,064. However, these types of bedding foundations exhibit a disadvantageous inherent tendency to have support legs, running from the upper wire grid to the base of the wire assembly, which are parallel to or perpendicular to the sides or ends of the wire grid assembly. Such orientation of the support legs tends to have good performance in resisting either lateral or longitudinal forces on the upper surface of the bedding foundation, but does not perform favorably in regard to forces from multiple directions in addition to their basic function of vertically supporting the upper surface of the bedding foundation.

An object of the present invention is to provide an additional novel and nonobvious type of support module for use in a nestably stackable bedding foundation which permits efficient manufacture, storage and shipping of bedding foundations of the semi-rigid wire type. A further object of the invention is to provide a support module that when connected to a wire grid does not have support legs that are in planes parallel to or perpendicular to the sides or ends of the wire grid assembly, and therefore, is better equipped to resist forces from multiple directions. Another object of the present invention is to provide four mounting points for connection of each support module to an upper wire grid assembly. Still another object of the present invention is to provide nestably stackable bedding foundation assemblies having support modules that permit easy stacking and removal of one bedding foundation with respect to another like bedding foundation. Another object of the invention is to provide a bedding foundation assembly that may be easily attached to a base structure.

The present invention addresses shortcomings in prior art bedding foundation assemblies, while providing the above mentioned desirable features.

SUMMARY OF THE INVENTION

The purpose and advantages of the present invention will be set forth in and apparent from the description and drawings that follow, as well as will be learned by practice of the invention.

The present invention is generally embodied in a support module for use in a bedding foundation of the relatively rigid or semi-rigid wire type. The support modules are nestably stackable individually, as well as when assembled in bedding foundations.

In a first aspect of the invention, a support module for use in a bedding foundation to support a wire grid assembly above a bedding foundation base has an independent wire form configured to define a top portion, a bottom portion, and four predominantly straight support legs, wherein the support legs are skewed with respect to each other, such that each respective support leg is not parallel to any of the other support legs, and wherein the top portion further has two upper wire segments, each upper wire segment being joined to a pair of the predominantly straight support legs and further having a predominantly straight section being located in a substantially horizontal first plane and being spaced apart from and substantially parallel to the respective predominantly straight section of the other respective upper wire segment.

In a further aspect of the invention, a nestable bedding foundation has a wire grid assembly and a plurality of support modules, each support module being an independent wire form configured to define a top portion, a bottom portion, and four predominantly straight support legs interconnecting the top portion to the bottom portion, and the top portion being connected to the wire grid assembly. The top portion further has two upper wire segments, each upper wire segment joined to a pair of the predominantly straight support legs and further having a predominantly straight section being located in a substantially horizontal first plane and being spaced apart from and substantially parallel to the respective predominantly straight section of the other respective upper wire segment. The bottom portion further has three wire segments, one of the three wire segments being joined to a pair of the predominantly straight support legs and further having a predominantly straight section being located in a substantially horizontal second plane, the two other of the three wire segments each being joined to a single predominantly straight support leg and further having a predominantly straight section being located in a substantially horizontal third plane and terminating in one of two wire ends facing in opposite directions with respect to each other. Also, the four predominantly straight support legs are skewed with respect to each other, such that each support leg is not parallel to any of the other respective support legs.

In a further aspect of the invention, a nestable bedding foundation is provided wherein all of the support modules are arranged so that a first bedding foundation is nestably stackable on top of a second identical bedding foundation, with the bottom portions of the support modules of the first bedding foundation being received through the wire grid assembly and within the respective support modules of the second identical bedding foundation.

In another aspect of the invention, a nestable bedding foundation is provided with none of the support legs being parallel to any side of the wire grid assembly.

Thus, the present invention provides an alternative to the prior art bedding foundations and support modules therefor. The present invention also simplifies the assembly and handling of bedding foundations constructed with the inventive support modules. The new assemblies improve the ability to handle force inputs to an upper wire grid assembly in multiple directions, while providing for greater ease in nestably stacking and unstacking the bedding foundation assemblies.

It is to be understood that both the foregoing general description and the following detailed description are exemplary and provided for purposes of explanation only, and are not restrictive of the invention as claimed. Further features and objects of the present invention will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

Figure 1:
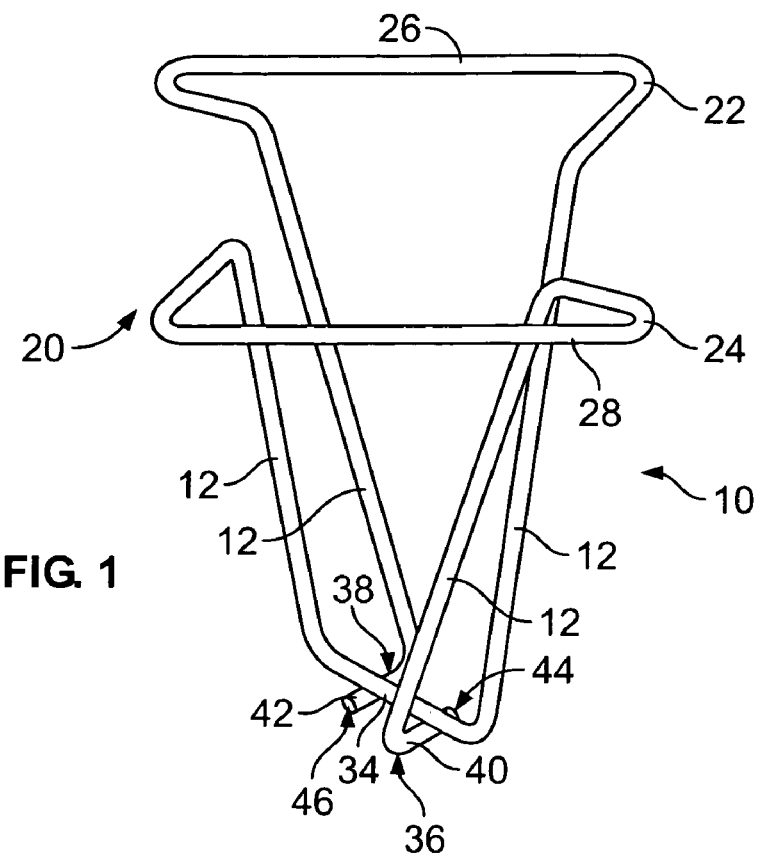
FIG. 1 is a perspective view of a preferred embodiment of a support module of the present invention.
Figure 2:
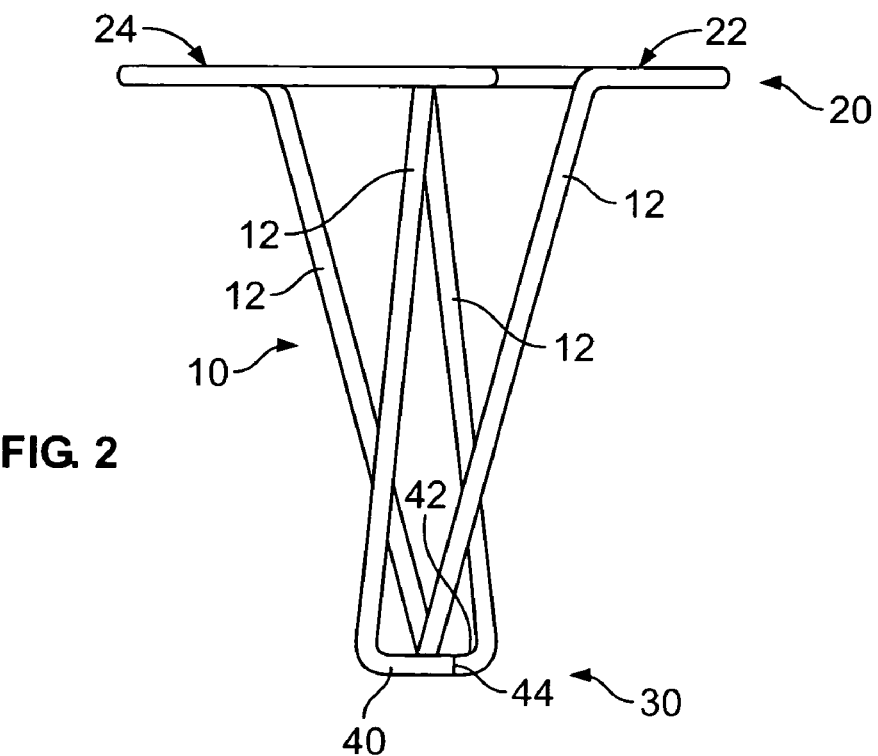
FIG. 2 is a side view of the support module of FIG. 1.

It should be understood that the drawings are not to scale and provide examples involving support modules and bedding foundation assemblies within the scope and spirit of the present invention. While considerable mechanical details of a support module and bedding assembly, including other plan and section views of the particular components, have been omitted, such details are considered well within the comprehension of those skilled in the art in light of the present disclosure. It also should be understood that the present invention is not limited to the preferred embodiments illustrated.

DETAILED DESCRIPTION OF THE PREFERRED EMBODIMENTS

Referring generally to FIGS. 1-5, it will be appreciated that the support modules and nestable bedding foundation of the present invention generally may be embodied within numerous configurations.

Referring to the preferred embodiments in FIGS. 1-5, a wire support module 10 is shown as an independent three-dimensional wire form. Support module 10 is configured for use in a bedding foundation 50 to support a wire grid assembly 60 above a bedding foundation base 80.

Support module 10 is configured to define a top portion 20, a bottom portion 30, and four predominantly straight support legs 12. It will be appreciated that support legs 12 are skewed with respect to each other, such that each respective support leg is not parallel to any of the other support legs. As best seen in the side view in FIG. 2, support legs 12 of support module 10 provide a cross-bracing support structure.

Top portion 20 includes two upper wire segments 22, 24. The first upper wire segment 22 is joined to a pair of the predominantly straight support legs 12, and further has a predominantly straight section 26. The second upper wire segment 24 is joined to a pair of the predominantly straight support legs 12, and further has a predominantly straight section 28. The respective predominantly straight sections 26, 28 are both located in a substantially horizontal first plane and are spaced apart from and substantially parallel to each other.

Bottom portion 30 includes three lower wire segments, the first of the three is a wire segment 32 which is joined to a pair of the predominantly straight support legs 12, and further has a predominantly straight section 34 being located in a substantially horizontal second plane. The two other lower wire segments 36, 38 each are joined to a single predominantly straight support leg 12, and further each has a predominantly straight section 40, 42, respectively, being located in a substantially horizontal third plane. The two lower wire segments 36, 38 are each connected to the predominantly straight section 34, and each also terminates in one of two wire ends 44, 46 of the independent wire form. The two wire ends 44, 46 face in opposite directions with respect to each other.

A support surface in the form of a wire grid 60 of bedding foundation 50 is a subassembly of wires connected together within a fairly common plane. Wire grid 60 preferably includes a rectangular-shaped border wire 62, including a pair of parallel side portions 64 and perpendicular thereto, a pair of parallel end portions 66. Laterally spaced wires 68 run parallel to each other and to side portions 64 and are connected to end portions 66, while longitudinally spaced wires 70 run parallel to each other and to end portions 66 and are connected to side portions 64. The wire connections in wire grid 60 are preferably made by welding or may be made by other suitable means of connection.

Figure 3:
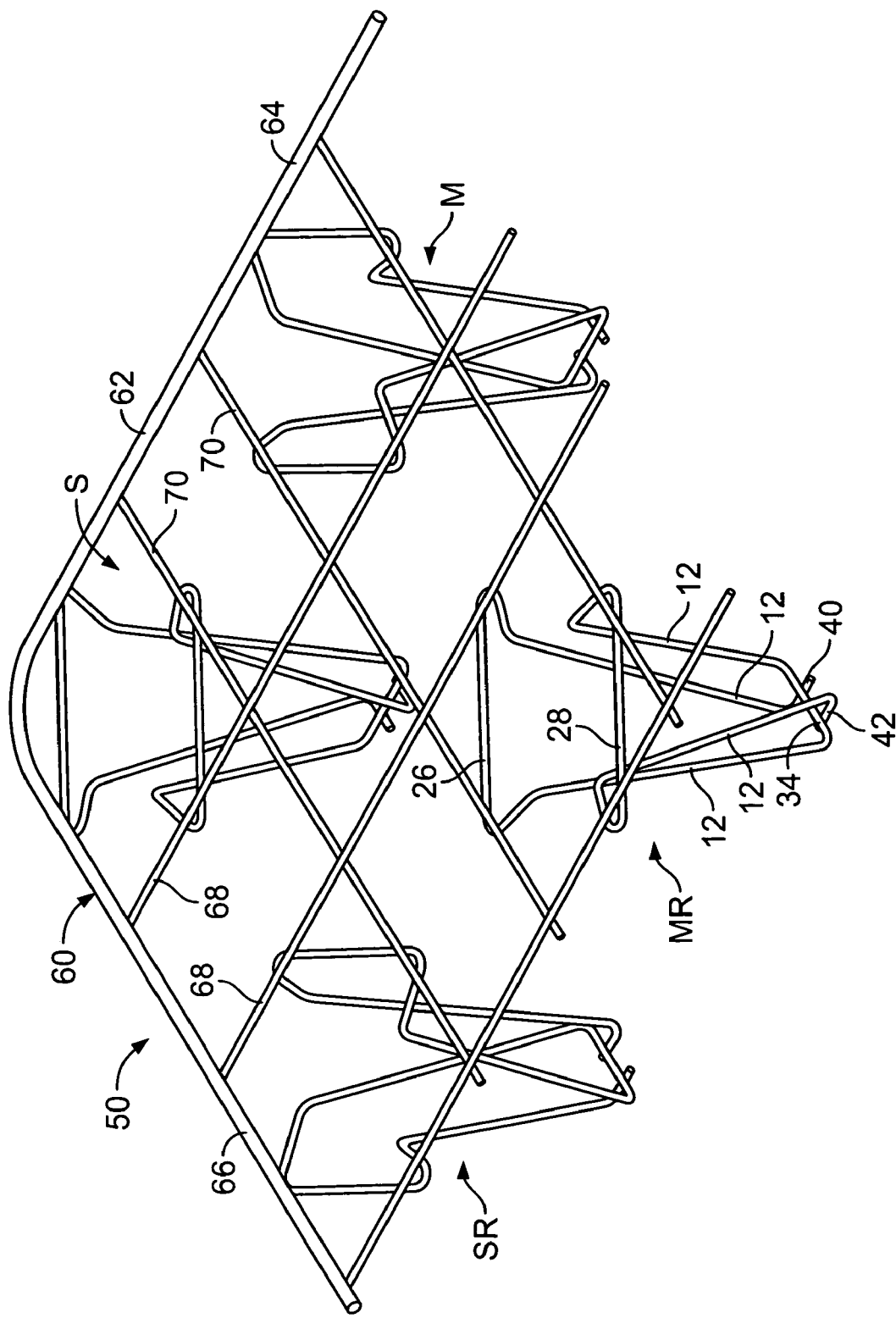
FIG. 3 is a perspective view of a portion of a bedding foundation showing a first pair of support modules of FIG. 1 connected to a portion of a wire grid assembly and being placed in two different rotational orientations, along with a second pair of modules having a mirror-image configuration relative to that of the module in FIG. 1 and being placed in two different rotational orientations.
Figure 4:
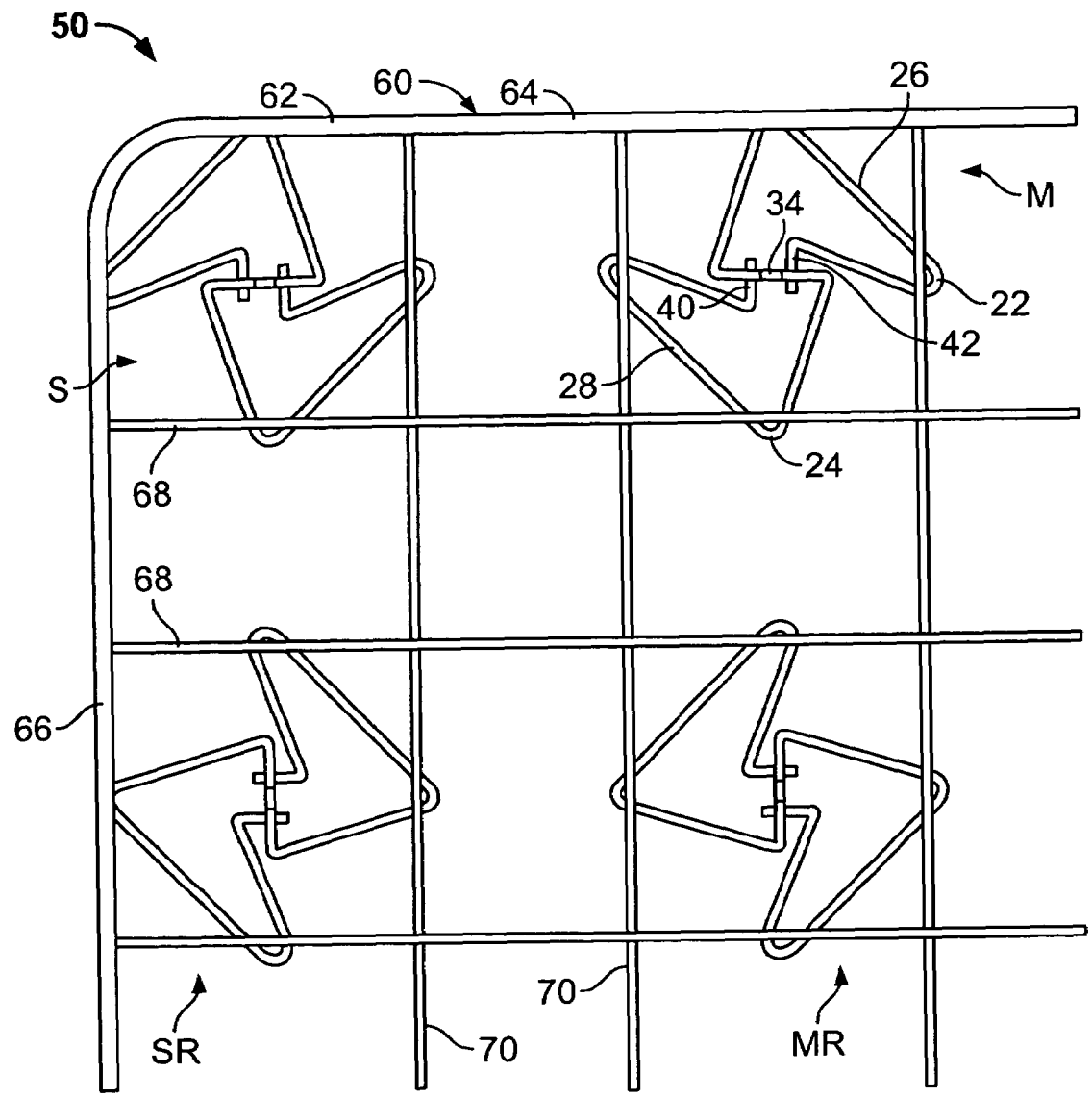
FIG. 4 is a top view of the portion of a bedding foundation shown in FIG. 3.

As best seen in FIGS. 3 and 4, the skewed orientation of support legs 12 results in none of support legs 12 being parallel to or perpendicular to side portions 64 or end portions 66 of border wire 62. This and the cross-bracing nature of support legs 12 results in a bedding foundation 50 that is better able to resist forces from multiple directions. To add to this enhanced capability, as seen in FIGS. 3 and 4, support modules 10 may be placed in a variety of different rotational orientations with respect to each other. For instance, module S could be said to be in a standard orientation, while module SR would be in a standard but rotated orientation, module M would be of a mirror-image orientation relative to the standard, and module MR would be in a rotated mirror-image configuration. Placements in a less repetitious pattern will result in less uniform load paths, and thereby better ability to handle forces from multiple directions.

It will be appreciated by one of skill in the art that due to the inclined nature of support legs 12, despite the relatively narrow waist, wider bottom, and apparent crossing of the support legs, modules 10 are ideally suited for nestably stacking one within another. Indeed, when further connected to a wire grid 60 in locations that correspond with openings in wire grid 60, nestably stackable bedding foundation assemblies 50 are formed. Moreover, by placing terminal ends 44, 46 of each individual piece of wire from which each support module is formed, within the overall spatial boundaries of the four support legs 12 of each module, wire ends 44, 46 are prevented from having a tendency to catch on a respective second bedding foundation assembly 50 when stacking or unstacking such assemblies.

Figure 5:
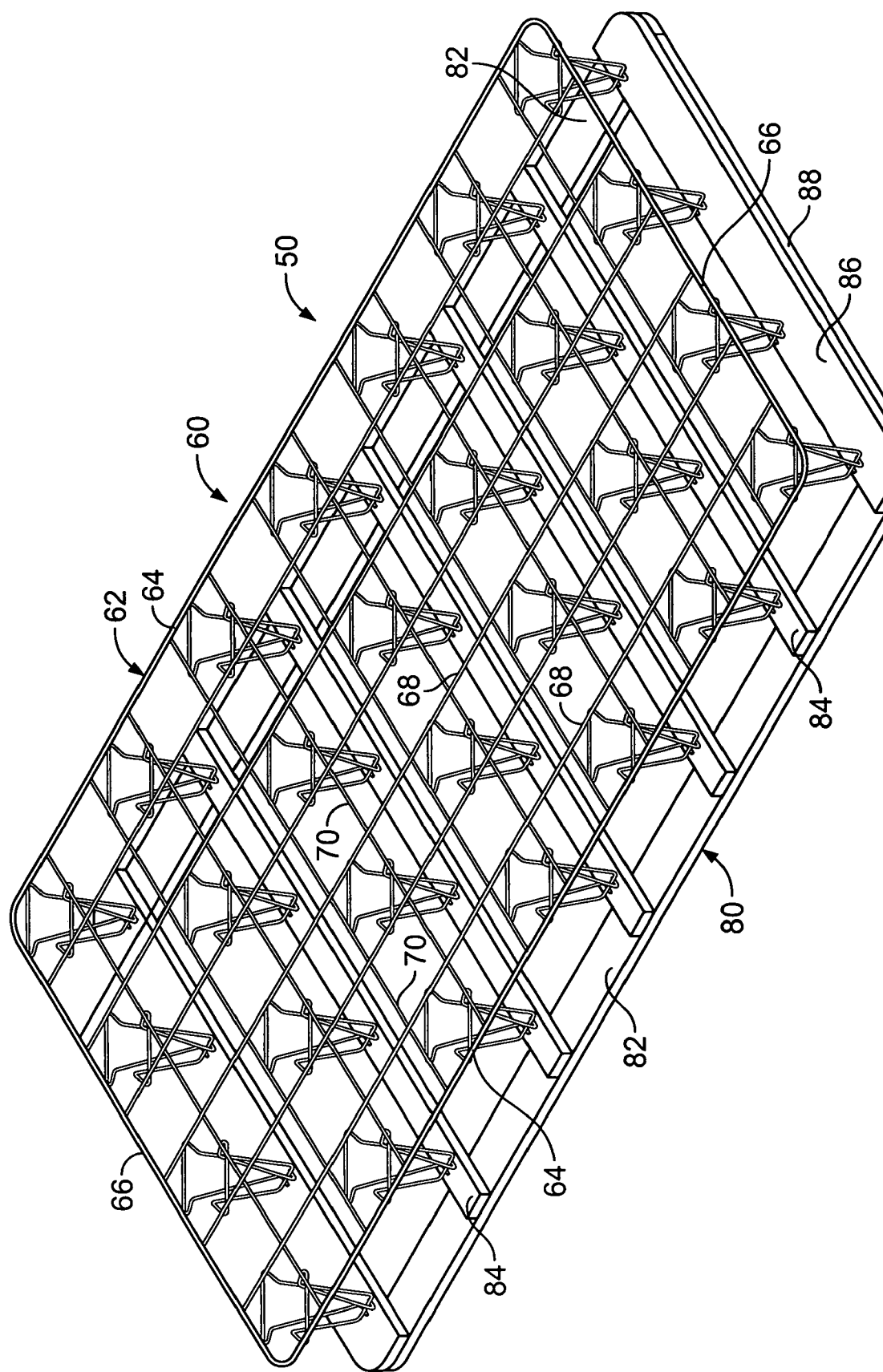
FIG. 5 is a perspective view of a bedding foundation having support modules of FIG. 1 being located in four rows, with each module having the same respective rotational orientation and being connected to a wire grid assembly and a slatted base.

As shown in FIG. 5, bedding foundation 50 may be connected to a bedding foundation base 80. This operation is frequently done after shipping stacks of nestably stacked bedding foundations 50 to bedding manufacturers. In such instances, the bedding manufacturers typically complete an assembly by mounting a wire bedding foundation 50 to a wooden bedding foundation base 80, and then covering the assembly in padding and fabric.

Bedding foundation base 80 is shown, for example, in a simple formation of a slatted wooden frame having side slats 82, connected to overlying lateral slats 84, and overlying end slats 86 which are further connected to lower end slats 88. In this form, the various slats are typically joined by nailing or stapling, but may be joined in any suitable manner. Also, while shown in a relatively simple wooden format, for instance for a twin bed, base 80 may be constructed in other configurations, having more or less longitudinal and lateral slats, and be made with materials other than wood, as well as with other methods of joining components. In essence, base 80 ultimately is to be configured to accept the mounting of a plurality of modules 10 to the upper side of the overlying lateral slats 84 and end slats 86, such as by stapling to a wooden slat the bottom portion of each module 10, at predominantly straight section 34 and/or at predominantly straight sections 40, 42.

It will be appreciated that support modules in accordance with the present invention may be provided in various configurations, and may be constructed with portions joined to each other or to other metal components such as by welding together the pieces of wire, or otherwise joining them. Any variety of suitable materials of construction, configurations, shapes and sizes for the components and methods of connecting the components may be utilized to meet the particular needs and requirements of an end user in constructing bedding foundations consistent with the present invention. It will be apparent to those skilled in the art that various modifications can be made in the design and construction of such support modules and bedding foundations without departing from the scope or spirit of the present invention, and that the claims are not limited to the preferred embodiments illustrated.

What is claimed is:

1. A support module for use in a bedding foundation to support a wire grid assembly above a bedding foundation base, the support module comprising a freestanding wire form configured to define a top portion, a bottom portion, and four predominantly straight support legs, wherein the support legs are skewed with respect to each other, such that each respective support leg is not parallel to any of the other support legs, and wherein the top portion further comprises two upper wire segments, each upper wire segment joined to a pair of the predominantly straight support legs and further having a predominantly straight section being located in a substantially horizontal first plane and being spaced apart from and substantially parallel to the respective predominantly straight section of the other respective upper wire segment.

2. A support module in accordance with claim 1, wherein a bottom portion is formed with a lower portion of each of the four support legs being bent into a substantially horizontal position.

3. A support module in accordance with claim 1, wherein a lower portion of each of two of the support legs is bent to form a portion of a predominantly straight wire segment that is oriented in a substantially horizontal second plane.

4. A support module in accordance with claim 3, wherein a lower portion of each of the respective other two of the support legs is bent to form a wire portion oriented in a substantially horizontal third plane and terminating in a respective end of the independent wire form.

5. A support module in accordance with claim 4, wherein the two respective ends of the independent wire form face in opposite directions with respect to each other.

6. A support module in accordance with claim 4, wherein the two respective ends are located within the space delineated by the support legs.

7. A support module in accordance with claim 4, wherein the two respective wire portions in the substantially horizontal third plane are connected to the predominantly straight wire portion in the substantially horizontal second plane.

8. A support module in accordance with claim 1, wherein the independent wire form of the support module consists of a single length of wire.

9. A support module in accordance with claim 1, wherein the respective support legs are disposed in independent directions from the top portion to the bottom portion in a manner in which from a side view at least two of the support legs appear to cross.

10. A nestable bedding foundation comprising a wire grid assembly and a plurality of support modules, each support module being an independent wire form configured to define a top portion, a bottom portion, and four predominantly straight support legs interconnecting the top portion to the bottom portion, the top portion being connected to the wire grid assembly; the top portion further comprising two upper wire segments, each upper wire segment joined to a pair of the predominantly straight support legs and further comprising a predominantly straight section being located in a substantially horizontal first plane and being spaced apart from and substantially parallel to the respective predominantly straight section of the other respective upper wire segment; the bottom portion further comprising three wire segments, one of the three wire segments being joined to a pair of the predominantly straight support legs and further comprising a predominantly straight section being located in a substantially horizontal second plane, the two other of the three wire segments each being joined to a single predominantly straight support leg and further comprising a predominantly straight section being located in a substantially horizontal third plane and terminating in one of two wire ends facing in opposite directions with respect to each other; and the four predominantly straight support legs are skewed with respect to each other, such that each support leg is not parallel to any of the other respective support legs.

11. A nestable bedding foundation in accordance with claim 10, wherein the wire grid assembly further comprises a border wire connected to a plurality of longitudinally spaced substantially straight wires and to a plurality of laterally spaced substantially straight wires.

12. A nestable bedding foundation in accordance with claim 10, wherein the top portion of a support module is connected to the wire grid assembly.

13. A nestable bedding foundation in accordance with claim 10, wherein the top portion of a support module is welded to a border wire of the wire grid assembly.

14. A nestable bedding foundation in accordance with claim 10, wherein the top portion of a support module is welded to at least one of a laterally spaced wire of the wire grid assembly and to at least one of a longitudinally spaced wire of the wire grid assembly.

15. A nestable bedding foundation in accordance with claim 10, wherein at least one of the support modules consists of a single length of wire.

16. A nestable bedding foundation in accordance with claim 10, wherein none of the support legs is perpendicular to any side of the wire grid assembly.

17. A nestable bedding foundation in accordance with claim 10, wherein none of the support legs is parallel to any side of the wire grid assembly.

18. A nestable bedding foundation in accordance with claim 10, wherein all of the support modules are arranged so that a first bedding foundation is nestably stackable on top of a second identical bedding foundation, with the bottom portions of the support modules of the first bedding foundation being received through the wire grid assembly and within the respective support modules of the second identical bedding foundation.

19. A nestable bedding foundation in accordance with claim 10, wherein the bottom portion of at least one support module is secured to a slatted foundation base.

20. A nestable bedding foundation in accordance with claim 10, wherein the respective support legs of each support module are disposed in independent directions from the top portion to the bottom portion in a manner in which from a side view at least two of the support legs appear to cross.

* * * * *